July 5, 1955
H. ERDMANN
2,712,398
DISPENSERS FOR RETAINING RINGS
Filed July 30, 1953
5 Sheets-Sheet 1
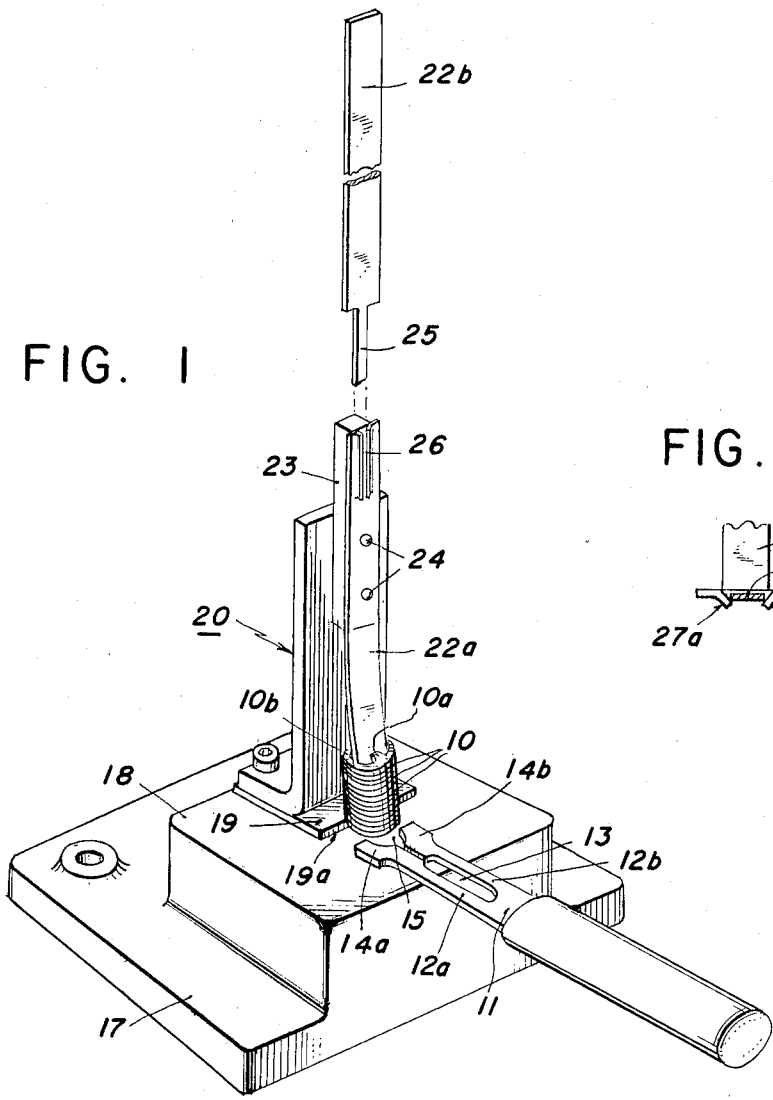
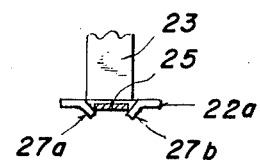
INVENTOR
HANS ERDMANN,
BY *Harold Kilcoyne*
ATTORNEY July 5, 1955  H. ERDMANN  2,712,398
DISPENSERS FOR RETAINING RINGS
Filed July 30, 1953  5 Sheets-Sheet 2

INVENTOR
HANS ERDMANN,
BY
ATTORNEY

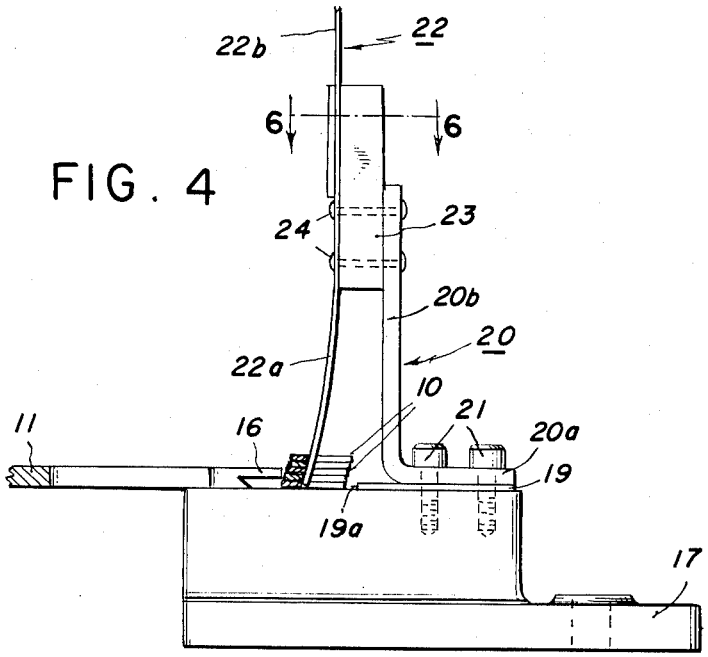
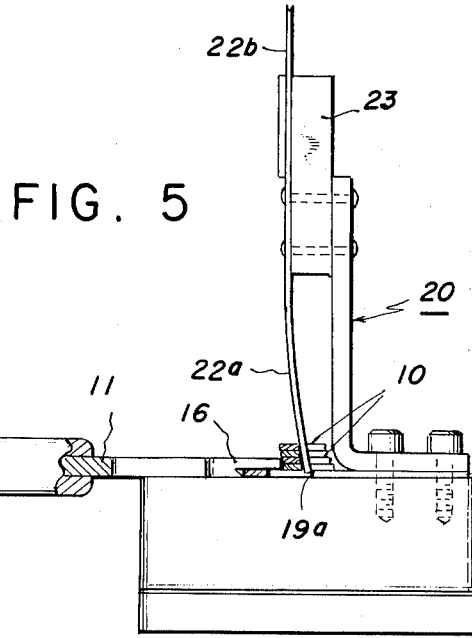

July 5, 1955  H. ERDMANN  2,712,398
DISPENSERS FOR RETAINING RINGS
Filed July 30, 1953                                                   5 Sheets-Sheet 4

INVENTOR
HANS ERDMANN,
BY
ATTORNEY

July 5, 1955
H. ERDMANN
2,712,398
DISPENSERS FOR RETAINING RINGS
Filed July 30, 1953
5 Sheets-Sheet 5
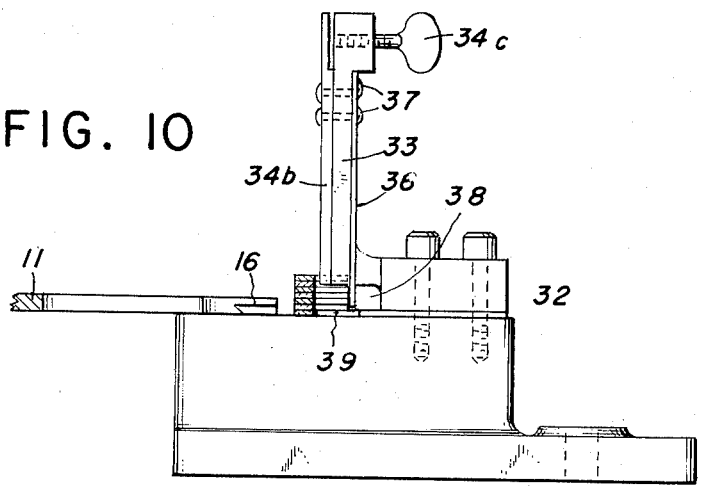
FIG. 10
FIG. 11
FIG. 12
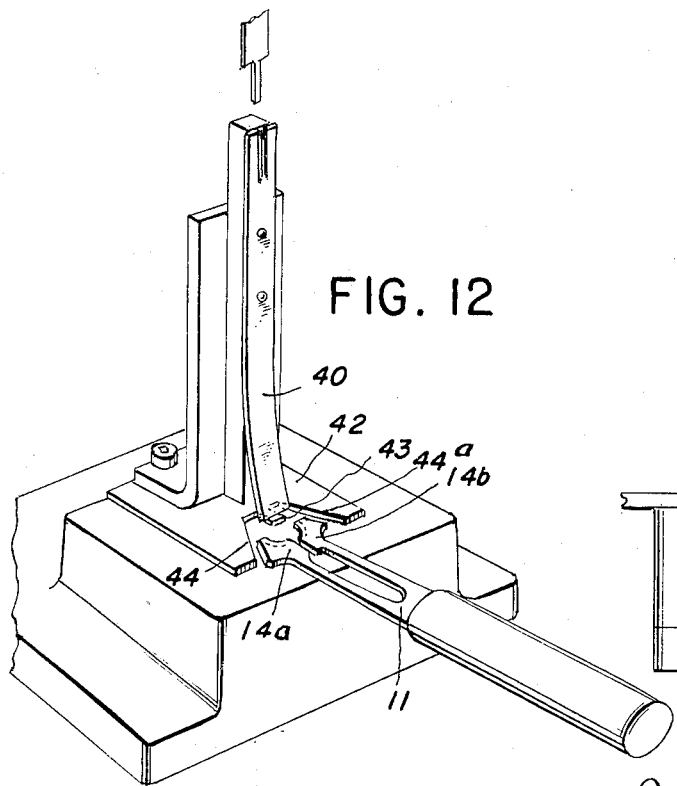
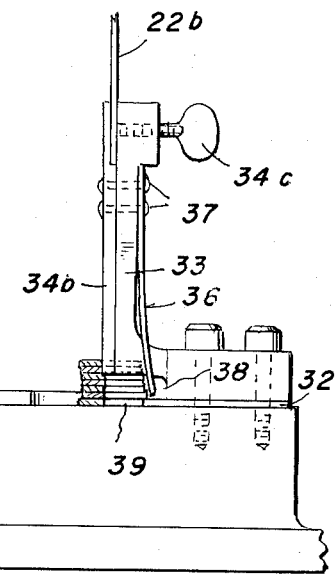
INVENTOR
HANS ERDMANN,
BY
ATTORNEY

United States Patent Office 2,712,398
Patented July 5, 1955

2,712,398
DISPENSERS FOR RETAINING RINGS

Hans Erdmann, Maplewood, N. J., assignor to Waldes Kohinoor, Inc., Long Island City, N. Y., a corporation of New York Application July 30, 1953, Serial No. 371,359

11 Claims. (Cl. 221—220)

This invention relates to improvements in dispensers for retaining rings, and more particularly to an improved dispenser for effecting withdrawal of single rings as required from a stack or column thereof, through the use of the so-called applicator which may also function as a ring handling and seating tool.

As explained in my prior application Serial No. 298,869, filed July 14, 1952, large scale use of retaining rings, for example in production line assembly methods, requires not only that an ample supply of the retaining rings be maintained at the different work stations located along the line, but also that provision be made for withdrawing the rings singly as they are needed. To satisfy these requirements, my aforesaid application discloses a retaining ring dispensing device including means for mounting a large volume of the rings arranged in stack formation, and provision for enabling the lowermost ring of the stack to be grasped and withdrawn by the same tool by which the ring is assembled on its shaft or pin, such tool being commonly referred to as an applicator.

Stated broadly, it is an object of the present invention to simplify the construction and improve the operation of a retaining-ring dispenser of the general type disclosed in my application aforesaid.

A more particular object of the present invention is the provision of the retaining-ring dispenser constructed and arranged so as to insure that the lowermost ring only of the stack thereof is grasped by the applicator when the latter is cooperated with the dispenser.

Another object of the invention is the provision of a retaining ring dispenser constructed and arranged so as to make available a large volume of retaining rings arranged in stack formation, which is characterized by a positive abutment for the lowermost ring of the stack serving to preclude its movement when engaged by the applicator, in conjunction with means permitting the ring or rings immediately above said lowermost ring to shift their position more or less freely upon said lowermost ring being pushed against the abutment by said applicator, thereby insuring that the ring or rings immediately above said lowermost ring offer no interference to the engagement of the applicator with the lowermost ring.

Yet another object of the invention is the provision of a retaining ring dispenser as last-above specified, wherein the means permitting the shifting of the ring or rings immediately above the lowermost ring is also effective responsively to withdrawal of said lowermost ring to cause the shifted ring or rings to return to their normal position, in which the next lowermost ring is free to drop into the place of the ring just previously withdrawn, thus to condition the dispenser for another ring-withdrawal operation.

The above and other objects of a retaining-ring dispenser according to the invention will be apparent from the following detailed description thereof, in which reference is had to the accompanying drawings, wherein—

Fig. 1 is a perspective view of one form of an improved retaining-ring dispenser as herein proposed, which additionally illustrates the separable construction of the stack rod, and the applicator approaching the lowermost ring of the stack thereof preliminary to engagement therewith;

Fig. 4 is a side elevation of a dispenser as shown in Fig. 1, looking from the right side thereof;

Fig. 5 is a view similar to Fig. 4 but illustrating the action of the applicator in gripping the lowermost ring of the stack thereof, as well as the shifting movement permitted the ring or rings immediately above said lowermost ring;

Fig. 6 is a section taken along the line 6—6 of Fig. 4;

Figs. 10 and 11 are views corresponding to Figs. 4 and 5 but illustrating the functioning of the variant form of applicator shown in Fig. 7; and Fig. 12 is a broken away perspective view of a modified form of dispenser which incorporates some of the features of both of the prior forms.

Figure 2:
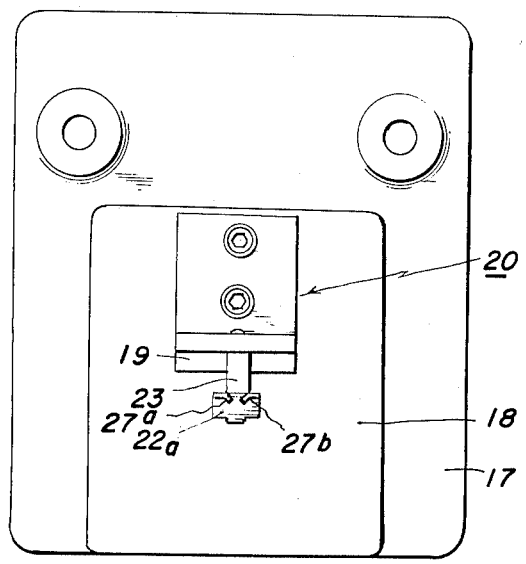
Fig. 2 is a plan view of the dispenser shown in Fig. 1, with separable part of the stack rod and the stack of rings omitted.

Preliminary to a description of the improved retaining ring dispenser of the invention, it will be understood that such is designed for the dispensing of the so-called open type of retaining ring generally indicated by the reference numeral 10, which as is well known subtends an arc only somewhat greater than 180°, so that a wide gap is provided between its ends. As illustrated, such a ring may be of the E type, that is to say it is provided with an inwardly directed middle lug 10a, and with inwardly directed end lugs 10b, so that when viewed in plan it has generally E shape.

It is further to be noted that the applicator employed with the dispenser of the invention may be and preferably is of the type disclosed in Patent No. 2,483,379, dated September 27, 1949, to Brell, and comprises a shank 11 subdivided into resilient arms 12a, 12b by a slot 13, the arms terminating in a ring clamping portion provided by segmental jaws 14a, 14b which together define a semi-circular recess 15 of diameter slightly less than the external diameter of the ring 10, whereby the jaws secure a ring seated in the recess with spring tension. When seated in said recess, the retaining ring is backed by a so-called backing flange 16 (Figs. 4 and 5) which bounds the ring-seating recess and extends a small distance over one face of the seated ring. The provision of the backing flange of course increases the axial thickness of the jaws, and thus the jaws, rather than having thickness corresponding to that of a single ring, in practice has thickness of two or even more rings.

It is a further feature of a retaining-ring dispenser of the present invention that it is designed to enable withdrawal of the rings therefrom by an applicator as aforesaid held with its backing flange 16 disposed upwardly, i. e. so that it overlies a ring body seated in the semi-circular recess provided by its jaws 14a, 14b. As explained in my prior application Serial No. 289,869, this positioning of the applicator with respect to the ring secured in its recess is of advantage in that the ring is backed from above by the backing flange 16 against thrusts imparted thereto from below during handling and assembly of the ring. Accordingly, the dispenser of this invention takes into consideration not only the extra thickness of the applicator jaws added by the backing flange 16, but also the positioning of the backing flange with respect to ring or rings disposed immediately above the lowermost ring, i. e. the ring or rings likely to be abutted by the edges of the backing flange in the ring-withdrawal operation.

Referring to Fig. 1 the dispenser according to the invention comprises a base 17 having an elevated portion providing a horizontal working surface 18. Secured to said base is an abutment member 19 which may be a rectangular plate having the thickness of a single retaining ring 10, whose forward edge 19a provides a transverse ring abutment whose purpose will be later explained. The base 17 mounts an L-shaped bracket 20 whose horizontal arm 20a is secured against the working surface 18 as by bolts 21, which preferably also secure abutment plate 19 to said surface. To the vertical arm 20b of said bracket is secured a vertical stack rod generally designated 22, which is spaced forwardly of said bracket arm 20b as by means of a narrow-width spacing block 23. Although referred to as a "rod" for convenience, the stack rod 22 preferably has strip form and its width is slightly less than the internal diameter of the rings 10. Thus, when a plurality of rings turned so that their open ends face rearwardly are threaded onto said stack rod, as in Fig. 1, they are secured against lateral disengagement therefrom by their end lugs 10b.

As best seen in Fig. 1, the stack rod 22 is of two-part construction and its lower part 22a is affixed at its upper end to the bracket arm 20b via the spacer block 23 as by rivets 24. By reference to Figs. 4 and 5, the lower end of the fixed stack-rod part 22a is free of and is moreover disposed slightly above the working surface 18 of the base. The upper stack-rod part 22b is adapted to be separably connected to the fixed lower part 22a thereof, and to provide for its coupling and uncoupling, the lower end of said upper stack-rod part 22b is formed as a narrow-width tongue 25 which is adapted to be inserted into a slot 26 provided in the upper end of the fixed stack-rod part 22a, and to be retained therein by angled flanges 27a, 27b which define said slot.

While it is possible to fashion the stack-rod 22 in one piece, its two-part and separable construction is of advantage in that such enables a stack of rings 10 on the separable part 22b of the stack rod to be supplied and installed as a package. Thus, the dispenser may be loaded simply by coupling the separable part 22b of the stack rod with a supply of retaining rings stacked thereon to the fixed stack-rod part 22a, whereupon the stack of retaining rings lowers by gravity until the lowermost ring rests against the working surface 18 of the base.

Reverting to the abutment plate 19, such is affixed to the working surface 18 of the base in position such that its transverse abutment edge 19a is disposed a slight clearance distance (providing the necessary tolerances) to the rear of the open ends of the lowermost ring 10 of the stack thereof now supported on said working surface. Accordingly, when the lowermost ring is pushed rearwardly by the applicator, it abuts the transverse abutment edge 19a and is held thereby, thus enabling the applicator jaws 14a, 14b to spread over and resiliently grip the ring in its ring-receiving recess aforesaid.

Due to the thickness of the applicator being greater than that of one ring by the thickness of its backing flange 16 as aforesaid, movement of the applicator into gripping engagement with the lowermost ring would be rendered difficult if not prohibited, unless the ring or rings immediately above the lowermost ring are freely shiftable when engaged by said backing flange. To provide for such shifting movement, it is a feature of the invention that the lower or fixed part 22a of the stack rod is made flexible. This may be simply achieved by forming said lower part as a leaf spring whose lower end is curved forwardly or away from the abutment edge 19a, such curvature being of an order providing adequate space between the lower end of the stack rod and its bracket 20 for the ring or rings immediately above the lowermost ring to shift rearwardly with respect thereto. Preferably also, the lower or free edge of stack-rod part 22a is formed as a tongue 28 having width corresponding substantially to the width of the gap between the ends of the ring 10. Such reduced-width tongue 28 enables the lower end of the stack-rod to move freely through the gap of the lowermost ring upon the latter being held by the abutment plate 19 against the push of the applicator.

The function of a dispenser as described is briefly as follows: Following loading of the dispenser by coupling the removable part 22a of the stack rod carrying a considerable number of rings 10 with the lower or fixed part 22a of said stack rod, the rings drop by gravity until the lowermost ring rests on the working surface 18 of the base 17. When it is desired to dispense a ring, the applicator with its backing flange 16 disposed upwardly is placed flush on said working surface 18 as shown in Figs. 1 and 4, and with its ring-receiving recess in generally front-to-rear alignment with the stack of rings held on the stack rod 22. Thereupon, the applicator is pushed rearwardly into engagement with the lowermost ring of the stack thereof, such resulting in said ring moving against the transverse abutment edge 19a. The aforesaid and continued rearward movement of the applicator required to seat the lowermost ring in its recess results in the transverse end edges of its backing flange 16 engaging against at least the next lowermost ring or rings of the stack. However, since the lower end of the stack rod is flexible, said next lowermost ring or rings may shift rearwardly with respect to the lowermost ring, as is indicated in Fig. 5, and thus they in nowise interfere with the action of the applicator in gripping the lowermost ring. The spring construction of the stack rod also insures its return movement with withdrawal of the applicator and lowermost ring gripped thereby, whereupon said next lowermost ring (now the lowermost ring) is free to drop into the space previously occupied by the withdrawn ring. Thus, the dispenser is automatically conditioned for the next ring-withdrawing operation.

Figure 3:
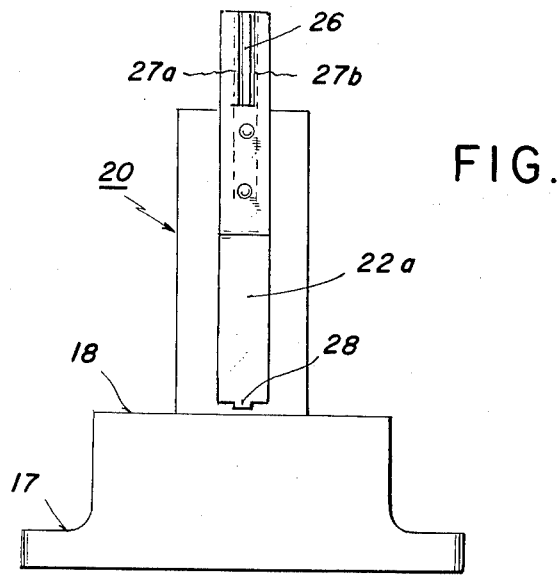
Fig. 3 is a front elevation of the dispenser parts illustrated in Fig. 2.
Figure 7:
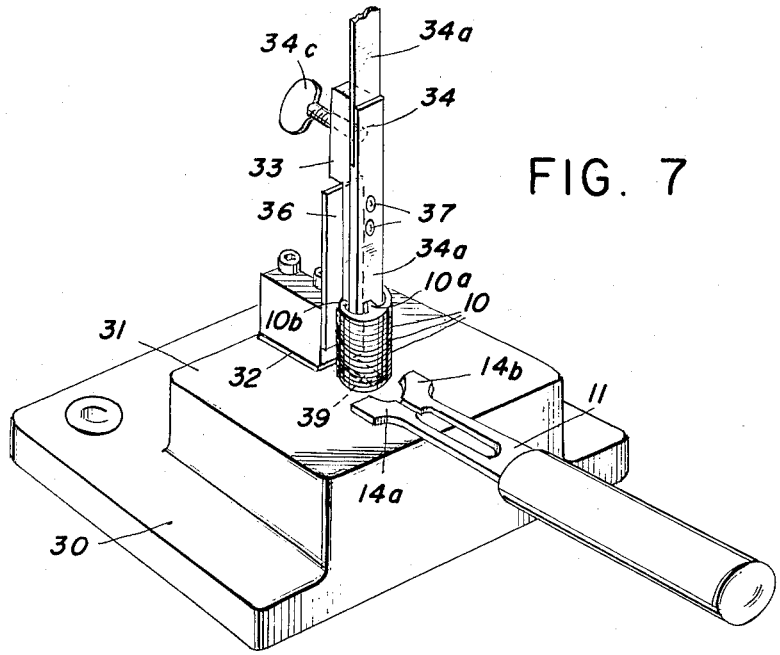
Fig. 7 is a view corresponding to Fig. 1 but illustrating another form of improved retaining ring dispenser according to the present invention.
Figure 8:
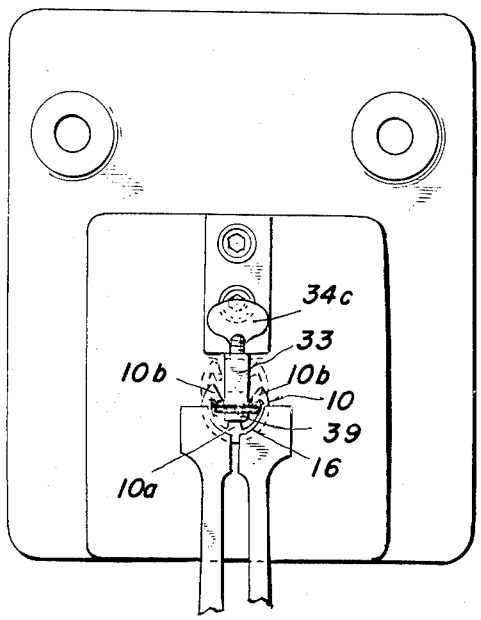
Fig. 8 is a plan view of the dispenser illustrated in Fig. 7 and which further illustrates the action of the applicator in gripping the lowermost ring of the stack thereof and of shifting the ring or rings immediately above the lowermost ring in rearward direction, the shifted rings being indicated in dotted lines.
Figure 9:
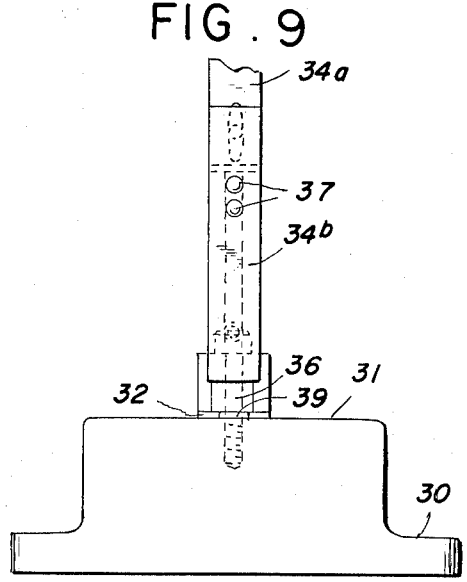
Fig. 9 is a front elevation of the applicator illustrated in Fig. 8, but with rings and applicator omitted.

Referring now to the variant form of dispenser illustrated in Figs. 7–11, such comprises a base 30 having a raised working surface 31 as previously described, the base mounting a ring-abutment member 32 and an L-shaped bracket member generally designated 33 for supporting a preferably two-part stack rod 34 with its lower end raised from said supporting surface, all as previously described in connection with the form of dispenser illustrated in Figs. 1–6. The upper or removable part 34a of the stack rod is coupled to the fixed lower part 34b thereof by a lapped form of connection as illustrated, said stack rod parts being secured as by a thumb screw 34c threaded into the vertical arm of the bracket 33.

The variant form of dispenser differs from the prior described form in that the lower part 34b of the stack rod is formed rigid, and the spring 36 which permits the rearward shifting movement of the ring or rings of the stack disposed immediately above the lowermost ring is formed separate from the stack rod, and is secured as by rivets 37 against the rear face of the vertical arm of the bracket 33. This positioning of the spring 36 is thus such that it is disposed to the rear of the stack of rings on the stack rod 34 and closely adjacent thereto. It will also be observed (Figs. 10 and 11) that the bracket 33 is provided with a cut-out 38 at the outside corner between its horizontal and vertical arms, which provides the necessary clearance space for the ring or rings disposed above the lowermost ring of the stack when the latter are shifted rearwardly by the push exerted thereon by the applicator backing flange 16.

It is also a feature of the modified form of the dispenser that the abutment member 32, instead of having a transverse abutment edge, is formed along its forward edge with a tongue 39 which is adapted to enter the recess of the lowermost ring of the stack and to engage against the inner edge of its middle lug 10a, with slight clearance.

Although differing from the prior described dispenser in structural detail, the operation of the modified form of dispenser is generally similar to that previously described. Thus, when it is desired to withdraw a single ring, the applicator is placed on the working surface 31 of the base, with its backing flange 16 disposed upwardly. Initial movement of the applicator pushes the lowermost ring rearwardly the slight amount required for its middle lug to engage against the forward edge of the abutment tongue 39, such holding the ring stationary as the applicator jaws spread about the same and finally seat it. During the continuing forward movement of the applicator, the front transverse edges of its backing flange 16 push against the ring or rings immediately above the lowermost ring. Due to the flexibility of the spring 36 against which said rings engage, they are free to shift rearwardly of the lowermost ring into the clearance cut-out 38 of the bracket 33, as illustrated in Fig. 11. Accordingly, the applicator may be pushed rearwardly the full amount required to seat the lowermost ring in its recess, without interference from the rings immediately above same. Upon withdrawal of the applicator and the seated (previously lowermost) ring, the spring 36 returns the shifted rings to their normal position, whereupon the now lowermost ring is free to drop onto the working surface 31 to the position formerly occupied by the withdrawn ring, with the result that the dispenser is conditioned for the next ring-withdrawing operation.

According to the further modification of dispenser illustrated in Fig. 12, such combines a stack rod 40 which may be similar to the stack rod 22 of the Figs. 1–6 form in that the lower part 40a thereof is formed as a leaf spring whose lower free end curves forwardly, with an abutment plate 42 having a forwardly projecting tongue 43 similar to the abutment tongue 39 of the Figs. 7–11 form. In addition, the abutment plate 42 is provided with a front-edge cut-out having slanting side edges 44, 44a which converge on one another. The slanted edges as aforesaid serve to guide the applicator towards the lowermost ring of the stack thereof and hence assists in causing the applicator to approach said ring in proper position to grip same. This guiding and centering action may be further enhanced by slanting the outside edges of the applicator jaws 14a, 14b complementally to the slanted edges 44, 44a of the cut-out.

Without further analysis, it will be seen that a retaining ring dispenser of the invention according to the illustrated forms thereof achieves the objectives set forth in the foregoing. Thus, its construction is more simple than that of the dispenser disclosed in my prior application Serial No. 298,869, and its operation is more certain due to the fact that the applicator may move to its ring gripping position without being blocked by the ring or rings disposed immediately above the lowermost ring of the stack thereof. The two-part construction of the stack rod represents another feature of practical advantage, since loading of the dispenser is greatly facilitated by supplying a plurality of such rings already disposed on the removable stack rod part as a package, so that loading merely requires coupling of the removable stack rod part to the fixed stack rod part.

As many changes could be made in carrying out the above constructions without departing from the scope of the invention, it is intended that all matter contained in the above description or shown in the accompanying drawings shall be interpreted as illustrative and not in a limiting sense.

I claim:

1. A retaining ring dispenser enabling the dispensing of single retaining rings from a stack thereof through the use of a ring gripping tool having a substantially semi-circular ring-recess and an arcuate backing flange for a ring seated in its recess, comprising a base having a horizontal working surface, a substantially vertically disposed stack rod for holding a plurality of retaining rings in stack formation on said working surface, means supporting the stack rod from the base with its lower end raised from said working surface, means providing a ring abutment of thickness corresponding to that of one ring secured to said working surface immediately to the rear of the lowermost ring of the stack, and spring means operatively related to said stack rod and being effective on at least the next lowermost ring but not on said lowermost ring of said stack, the construction and arrangement being such that, when a tool placed on the working surface with its recess in alignment with the lowermost ring and with its backing flange disposed upwardly is pushed rearwardly so as to force the lowermost ring against the abutment and thereupon to grip said ring, said spring means enables at least the next lowermost ring or rings of the stack to shift rearwardly under the force applied to it by the backing flange, and upon withdrawal of said tool and ring gripped thereby returns the shifted ring or rings to normal position.

2. A retaining-ring dispenser as set forth in claim 1, wherein said spring means comprises the lower end of the stack rod.

3. A retaining-ring dispenser as set forth in claim 1, wherein said spring means comprises a leaf spring extending in continuation of the stack rod.

4. A retaining-ring dispenser as set forth in claim 1, wherein the spring means comprises a vertically disposed leaf spring arranged to the rear of the stack rod and in position to abut the rearwardly disposed ends of the rings.

5. A retaining-ring dispenser as set forth in claim 1, wherein the stack rod comprises a fixed lower-end part and a removable upper-end part.

6. A retaining ring dispenser as set forth in claim 1, wherein the abutment means comprises a plate affixed to the working surface having its forward edge extending transversely of the base and just rearwardly of the lowermost ring of the stack thereof.

7. A retaining ring dispenser as set forth in claim 1, wherein the abutment means comprises a plate affixed to the working surface and having a forwardly extending tongue adapted to extend into the interior of the lowermost ring and of length as to abut the middle portion of said ring.

8. A retaining ring dispenser as set forth in claim 1, wherein the means for supporting the stack rod comprises an L-shaped member having its horizontal arm affixed to the working surface and its vertical arm supporting the stack rod, and wherein the spring means comprises a leaf spring affixed at a point substantially above its lower end to the vertical arm of said member.

9. A retaining ring dispenser as set forth in claim 8, wherein the L-shaped member is provided with a forwardly facing cut-out at the outside corner of its arms, into which the lower end of the leaf spring extends, said cut-out being positioned to receive the next to lowermost ring or rings upon the latter being pushed rearwardly by engagement of the tool therewith.

10. A retaining ring dispenser as set forth in claim 1, wherein the abutment means comprises a plate affixed to the working surface and being provided with a front-edge cut-out having slanting sides which converge on one another thereby to guide the applicator into gripping engagement with the lowermost ring of the stack thereof.

11. A retaining ring dispenser as set forth in claim 10, wherein the abutment plate is further provided with a forwardly extending tongue contained in said cut-out and which is adapted to extend into the interior of the said lowermost ring and to abut the middle portion of said ring.

No references cited.